(12) United States Patent
Fernandez Herrero

(10) Patent No.: US 12,077,962 B2
(45) Date of Patent: Sep. 3, 2024

(54) RESISTANT MODULAR HOLLOWED-OUT PLATE FOR MANUFACTURING SLABS

(71) Applicant: Francisco Javier Fernandez Herrero, Leon (ES)

(72) Inventor: Francisco Javier Fernandez Herrero, Leon (ES)

(73) Assignee: Francisco Javier Fernandez Herrero, Leon (ES)

( * ) Notice: Subject to any disclaimer, the term of this patent is extended or adjusted under 35 U.S.C. 154(b) by 139 days.

(21) Appl. No.: 16/768,542

(22) PCT Filed: Jan. 8, 2018

(86) PCT No.: PCT/ES2018/070009
§ 371 (c)(1),
(2) Date: May 29, 2020

(87) PCT Pub. No.: WO2019/135013
PCT Pub. Date: Jul. 11, 2019

(65) Prior Publication Data
US 2020/0332528 A1 Oct. 22, 2020

(51) Int. Cl.
*E04C 2/34* (2006.01)
*B32B 3/12* (2006.01)
(Continued)

(52) U.S. Cl.
CPC ............. *E04C 2/3405* (2013.01); *B32B 3/12* (2013.01); *B32B 3/266* (2013.01); *B32B 7/08* (2013.01);
(Continued)

(58) Field of Classification Search
CPC .... B32B 3/12; B32B 3/28; B32B 3/30; B32B 3/266; B32B 7/08; E04C 2/3405;
(Continued)

(56) References Cited

U.S. PATENT DOCUMENTS 2,481,046 A * 9/1949 Scurlock ............... E04C 2/3405
428/116
3,525,663 A 8/1970 Hale
(Continued)

FOREIGN PATENT DOCUMENTS

FR         2871406 A1 * 12/2005 ............. B32B 27/04
WO    WO-2011011634 A1 *  1/2011 ............... B32B 3/12

OTHER PUBLICATIONS

Translation of FR2871406A1 (bib, description and claims). (Year: 2005).*

(Continued)

*Primary Examiner* — Catherine A. Simone
(74) *Attorney, Agent, or Firm* — Calderone McKay LLC

(57) ABSTRACT

The invention relates to plate that comprises an upper strip (1), a lower strip (2), both of which are flat, and a multidirectionally folded, curved or undulate intermediate structure (3) arranged between the upper strip (1) and the lower strip (2), and which is joined to the upper (1) and lower (2) strips at contact zones or connection points (4) and (5), intermittently located and distributed, such that it defines at least two chambers, channels or hollow spaces, interstitial (6) and (7) and continuous, which extend throughout the plate in at least two different directions. This way, a lightweight plate is obtained that is structurally, acoustically and thermally resistant, easy to systematically manufacture or mount and can be efficiently used as an integral system for constructing slabs and similar, since the inner holes can also be used as integrated accessible channels for installations.

6 Claims, 11 Drawing Sheets

(51) Int. Cl.
  *B32B 3/26*  (2006.01)
  *B32B 7/08*  (2019.01)
  *E04B 1/16*  (2006.01)
  *E04C 2/52*  (2006.01)
  *E04B 5/02*  (2006.01)

(52) U.S. Cl.
  CPC .............. *E04B 1/167* (2013.01); *E04C 2/521* (2013.01); *E04C 2002/3422* (2013.01); *E04C 2/50* (2013.01)

(58) Field of Classification Search
  CPC .... E04C 2/521; E04C 2/50; E04C 2002/3422; E04C 2002/3411; E04C 2002/3438; E04C 2002/3433; E04C 2002/3427; E04C 2002/3416; E04B 1/167; Y10T 428/24661; Y10T 428/24678; Y10T 428/24669

USPC .......................................... 428/178; 52/793.1
  See application file for complete search history.

(56) References Cited

U.S. PATENT DOCUMENTS 4,025,996 A * 5/1977 Saveker ................ E04C 2/3405
                                                    428/595
  5,894,045 A    4/1999 Desrondiers
  2002/0028318 A1* 3/2002 Clark .................... E04C 2/3405
                                                    428/178
  2015/0004371 A1  1/2015 Noble

OTHER PUBLICATIONS

International Search Report, PCT/ES2019070009, Mailed Apr. 10, 2018.

* cited by examiner

RESISTANT MODULAR HOLLOWED-OUT PLATE FOR MANUFACTURING SLABS

OBJECT OF THE INVENTION

The object of the present invention, as established by the title, is a resistant modular hollowed-out plate for manufacturing slabs and similar.

The present invention is defined by the structural and design characteristics of each one of the elements that form part of the plate. Said characteristics make it possible for the plate to act as a slab and similar, and since it has a lattice of multidirectionally continuous holes on the inside thereof, it is especially light without negatively affecting the resistive characteristics thereof, in addition to also being able to efficiently integrate all of the necessary features for said use, which include housing installations and similar and allowing the same to pass through.

Therefore, the present invention falls within the field of slab-type constructive elements and similar used in the construction of buildings.

BACKGROUND OF THE INVENTION

A slab is a structural element in the shape of a horizontal plane (or inclined for covers), which supports its own weight and overloads from use, partitioning, dynamics, etc., without the need to be supported on the entire surface thereof. Said loads are transmitted to the ground by means of other elements of the structure, such as beams, pillars, walls and the foundation.

Currently, the most common slabs are made of reinforced concrete and typically constituted by concrete beams and joists (reinforced in situ, precast, pre-stressed, etc.), blocks (or light pieces of ceramic, concrete, etc.), and an upper layer of compressed concrete, lightly reinforced by means of a steel mesh. Other types of slabs that are less common nowadays, or used for more specific purposes, are made with boards, the lower face thereof resting on joists or beams, unidirectionally or bidirectionally arranged, made of wood or steel, or made with structural panels consisting of two wood boards adhered on both sides to a core of a light material, such as expanded polystyrene, etc.

Of the different types of reinforced slabs, the following are the most common:

Unidirectional slabs, consisting of joists (of reinforced concrete or metal) blocks (mounted between the joists), or pre-slabs, and a layer of compressed reinforced concrete. The joists transmit loads from the layer of compression to the perimeter beams or edge beams.

Bidirectional or reticular slabs: made up of coffers (or other lightweight elements) arranged as a grid. Between these and above them a steel bar frame is mounted in both directions and filled with concrete. The loads are transmitted to the pillars by means of solid capitals. The coffers are usually removed (recovered).

Other slabs of reinforced concrete. Solid slabs are a type of slab that is heavier. Lighter slabs made from reinforced concrete by means of lighter fillers or unidirectional inner holes, completely covered in concrete, are usually called hollowed-out core slabs. Reinforced slabs that are less thick, on unidirectional steel corrugated plates, forming a structural assembly that is often called composite slab, are also manufactured. The slabs described are based on unidirectional designs that must be additionally supported by perimeter beams or edge beams.

Reinforced concrete slabs are the most commonly used type due to advantages such as the rigidity of the material and the availability and cheap cost of the same, in spite of disadvantages such as excessive weight and other inefficiencies of the previously mentioned constructive procedures. Slabs of this type can bear heavy loads, even for relatively wide spans, and can make up monolithic assemblies that are highly fire-resistant with acceptable acoustic insulation.

Thus, in all of the aforementioned reinforced concrete slabs the necessary structural resistance is achieved, regardless of whether they are unidirectional or bidirectional, although at the cost of their weight. Also in all of the aforementioned cases, the corresponding slabs do not have interstitial, accessible spaces for the placement of installations or conduits, or for the same to pass through. Therefore, the slabs used in constructing buildings must additionally be complemented by one or two hollowed-out layers or chambers, accessible or not, built attached to the lower or upper faces thereof, for the placement of the necessary installations or conduits, or for the same to pass through. These constructed layers additionally increase the actual thickness of the slabs but do not collaborate in the main structural function.

Therefore, the object of the present invention is the development of a plate that, with a notably lower weight than common current slabs, and with load-bearing and resistive capacities equal to or greater than common current slabs, integrates all of the indicated features and can be manufactured in a quick, efficient and systematic way. The development of said plate is described below and the essential characteristics thereof are included in the first claim.

DESCRIPTION OF THE INVENTION

The object of the present invention is a resistant modular hollowed-out plate comprising two flat strips arranged in parallel, connected by means of an intermediate lamellar structure that multidirectionally forms repetitive folds, curves or undulations.

The term strip refers to a structural element in the form of a two-dimensional rigid surface, not necessarily flat, and with a small thickness in relation to the rest of its dimensions, with a basically continuous appearance, although it could be made by joining pieces, using several different pieces, and/or could include some surface holes and/or linear reinforcements contained on the surface or longitudinally attached to the same.

The intermediate structure of the plate, either folded, curved or undulate, extends in the space comprised between the two flat outer strips and is joined to them at multiple points or zones, intermittently joined and distributed, defined by the folds, curves or undulations thereof in the form of slightly truncated vertices or peaks, or coinciding with some of the areas thereof that have greater folds or curves.

The flat outer strips can be relatively thin thanks to the multiple points or zones intermittently located and distributed, by means of which they are joined to the intermediate folded structure. In specific cases, the flat outer strips can include linear reinforcements oriented according to the plane thereof, connecting said joining points or zones to the folded, curved or undulate intermediate structure, and/or can also include surface holes or perforations distributed between said joining zones.

As a result of the arrangement of the folded, curved or undulate intermediate structure, intermittently fixed, as was described, to the two flat outer strips arranged in parallel, at least two continuous interstitial chambers, channels or hollow spaces are obtained, which extend along the plate in at least two directions, comprised at least between each one of the two flat outer strips and the intermediate structure.

For specific uses or applications, the design of the plate described is advantageous due to the added functionality from the existence and geometry of the indicated chambers or hollow spaces, by the multidirectionally folded, curved or undulate form of the intermediate structure and also due to the particular characteristics of the physical behavior thereof (mechanical, thermal, acoustic, etc.), derived from the shape thererof, and different from those of other existing structures.

One possible way to systematically generate the form of a folded, curved or undulate intermediate structure like the one described which makes the manufacturing of the same possible from a very small number of types of pieces, consists of joining repeated modules. In one possible embodiment, said modules have the form of truncated, hollowed-out and trimmed pyramids, with a specific number of sides or repeated groups of the same.

Likewise, another possible way to systematically generate the form of a folded, curved or undulate intermediate structure like the one described, which even makes the manufacturing thereof possible by means of a continuous process, is from the surface obtained by means of the movement of a flat, continuous and broken, curved or undulate generatrix, along a directrix that is also flat, continuous and broken, curved or undulate.

Without excluding other possible uses or applications, the plate object of the invention offers several advantages for integrally manufacturing slabs and similar, including other structural systems and constructive enclosures. The modularity and light weight thereof allows the same to basically be precast in the shape of wide plate panels or segments, transported and assembled on site, instead of being constructed in situ. The structural arrangement of the plate, multidirectionally divided, as was previously described, makes it possible for said plate to be self-supporting. This means that when horizontally arranged it can support spans of typical dimensions for buildings, without the need to construct beams, supported directly by the pillars. Likewise, the light weight of the plate, facilitated by the structural arrangement thereof, makes it possible to reduce the weight the rest of the structural elements by which it is supported. The existence of wide inner chambers or hollowed-out spaces facilitates a notable capacity for acoustic and thermal insulation for the indicated uses. The multidirectional continuity of said inner hollowed-out spaces, and their adjacency to the flat outer strips, makes it possible for the same to be used as permanently integrated channels, accessible for the placement of installations and conduits, and even for the distribution of heat and cold to adjacent inhabited spaces, eliminating the need to construct additional chambers, hollowed-out spaces or channels.

Except when indicated otherwise, all of the technical and scientific elements used in this specification have the meaning commonly understood by a person with average skill in the art to which this invention belongs. When this invention is put into practice, methods and materials may be used that are similar or equivalent to the ones described in this specification.

Throughout the description and claims, the word "comprise" and its variants are not intended to exclude other technical characteristics, additions, components or steps. For those skilled in the art, other objects, advantages and characteristics of the invention may be deduced from both the description and the practical use of the invention.

EXPLANATION OF THE FIGURES

As a complement to the description being made, and for the purpose of helping to make the characteristics of the invention more readily understandable, in accordance with a preferred example of practical embodiment thereof, said description is accompanied by a set of drawings constituting an integral part thereof which, by way of illustration and not limitation, represent the following.

PREFERRED EMBODIMENT OF THE INVENTION

With reference to the figures, different aspects of the modular hollowed-out plate object of the invention are explained in detail below, and a preferred embodiment of the same is described.

Figure 1A:
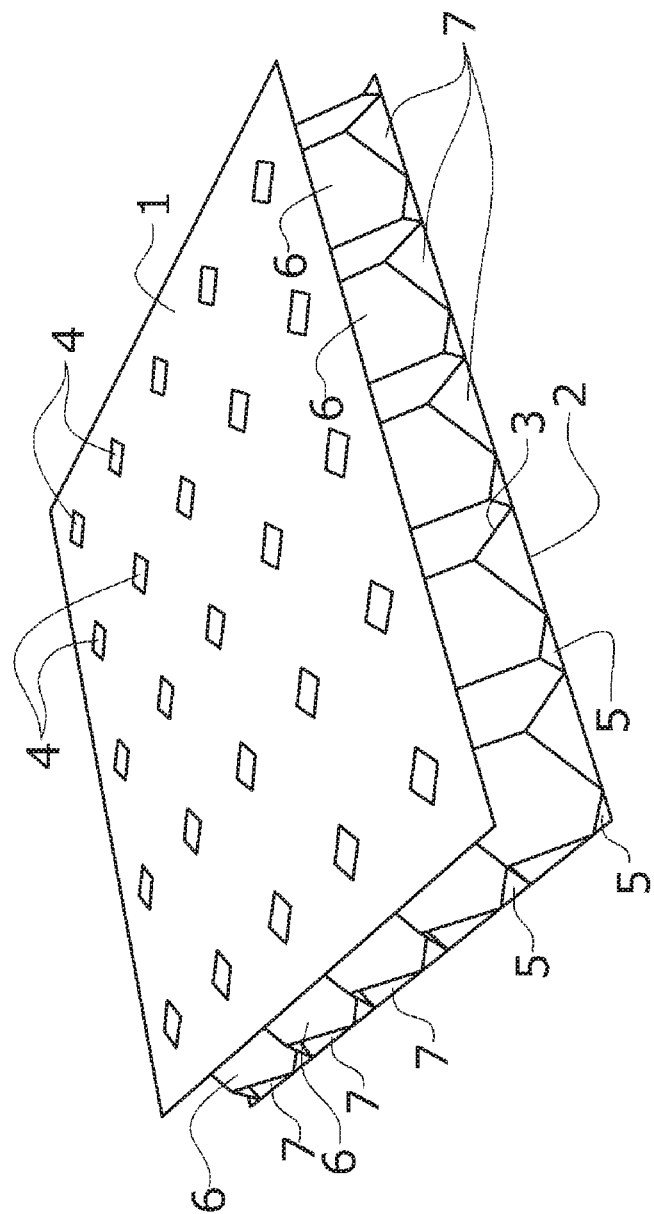
FIGS. 1A and 1B show two schematic representations of a first embodiment of the plate object of the invention in perspective view.
Figure 1B:
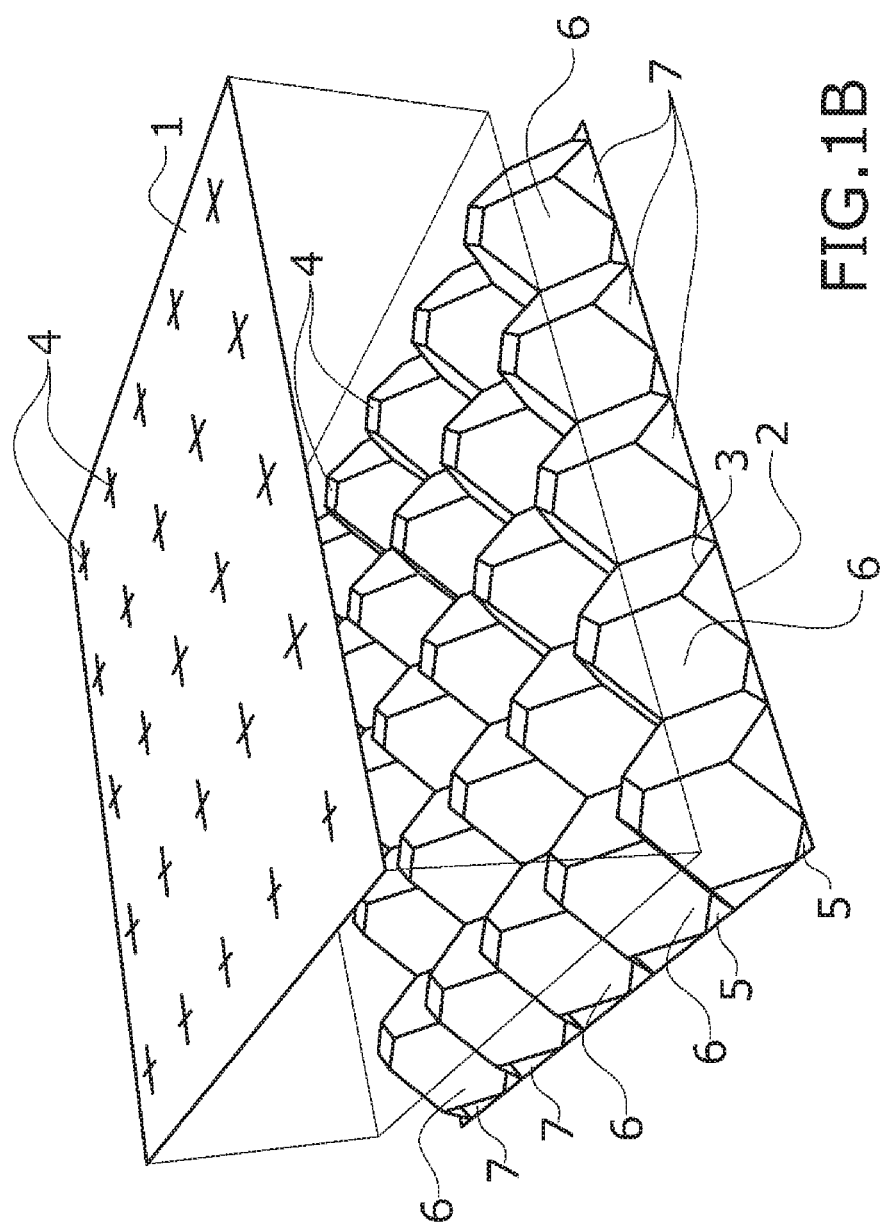

FIGS. 1A and 1B show that the lightweight plate object of the invention, in the most simplified embodiment thereof, comprises:

A flat upper strip (1)
A flat lower strip (2)
A multidirectionally folded, curved or undulate intermediate structure (3) arranged between the upper strip (1) and the lower strip (2), and which is joined to the upper (1) and lower (2) strips at contact zones or connection points (4) and (5), intermittently located and distributed, respectively, such that it defines at least two chambers, channels or hollowed-out spaces (6) and (7), interstitial and continuous, which extend throughout the plate in at least two different directions.

FIG. 1B shows a simplified representation in perspective view of the same embodiment of the plate represented in FIG. 1A, wherein the flat upper strip (1) has been moved so that the intermediate structure (3) is visible.

Figure 1C:
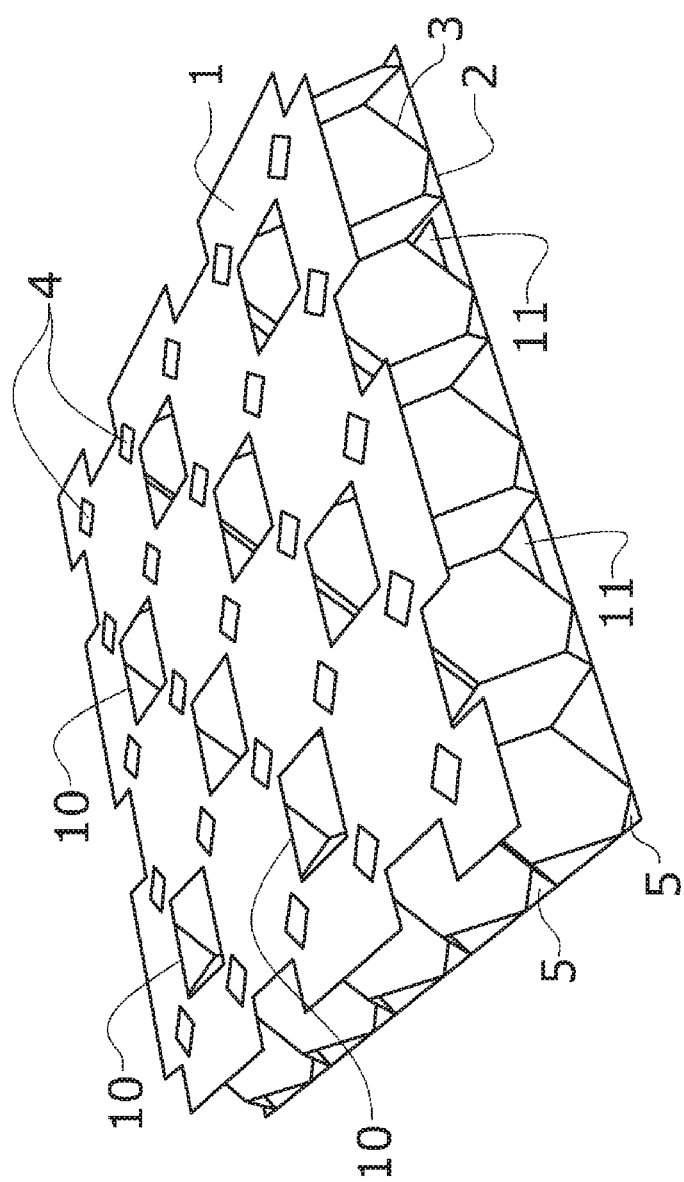
FIG. 1C shows a schematic representation of a complementary embodiment of the plate of FIG. 1A, with holes or perforations on the flat outer strips.

In other possible embodiments of the plate, the flat upper (1) and lower (2) strips could include perforations (10) and (11), respectively, as shown in FIG. 1C. The specific arrangement and geometry of said perforations does not have to necessarily coincide with that which is illustrated in FIG. 1C, but said perforations cannot coincide with the joining areas or connection points (4) and (5) of the flat strips and the intermediate structure. Also in a complementary way, the flat upper (1) and lower (2) strips could have linear reinforcement elements oriented according to the corresponding planes thereof.

In the case that the upper (1) and lower (2) strips respectively include perforations like (10) and (11) of FIG. 1C, said perforations respectively facilitate access from the outside of the plate to the continuous interstitial chambers, channels or hollowed-out spaces (6) and (7).

Figure 1D:
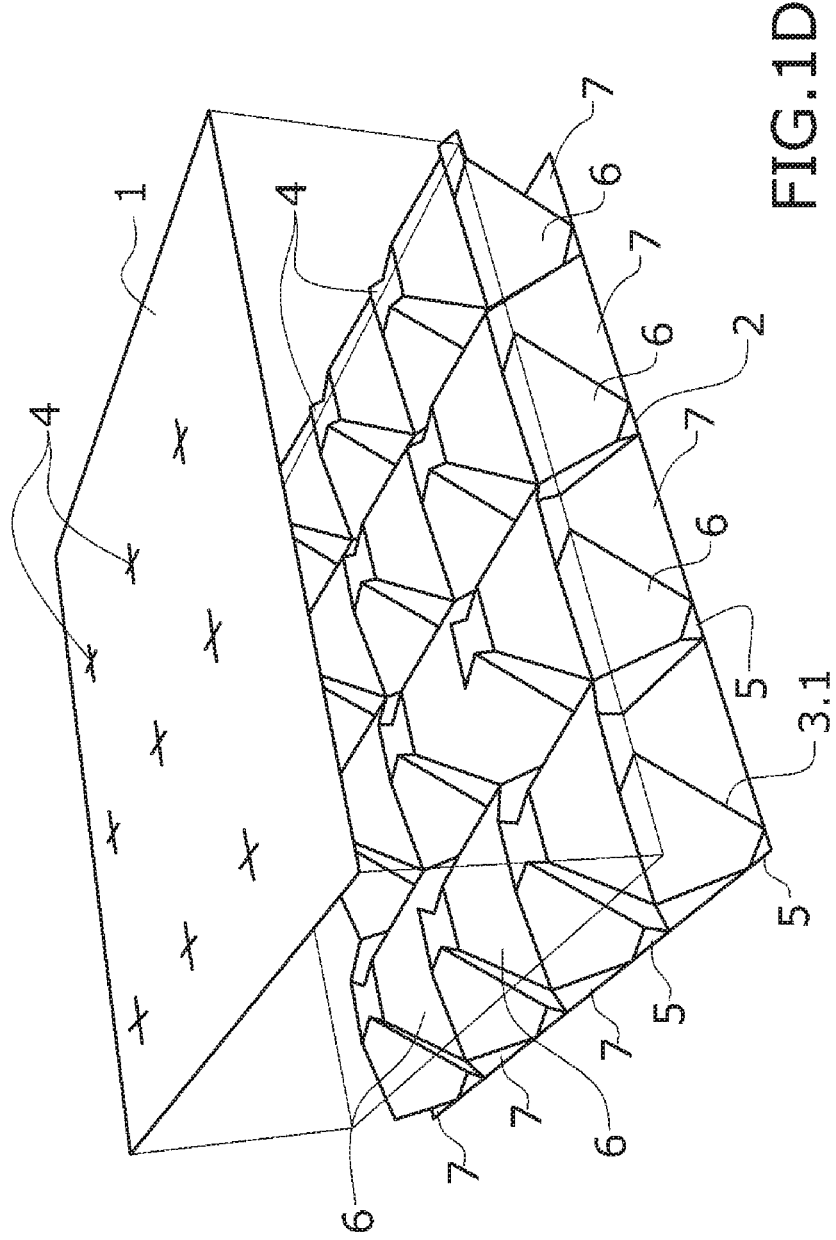
FIGS. 1D, 1E and 1F show schematic representations of other possible embodiments of the plate, to generally illustrate the fact that the intermediate structure can have the shape of a multidirectionally folded, curved or undulate strip, respectively.
Figure 1E:
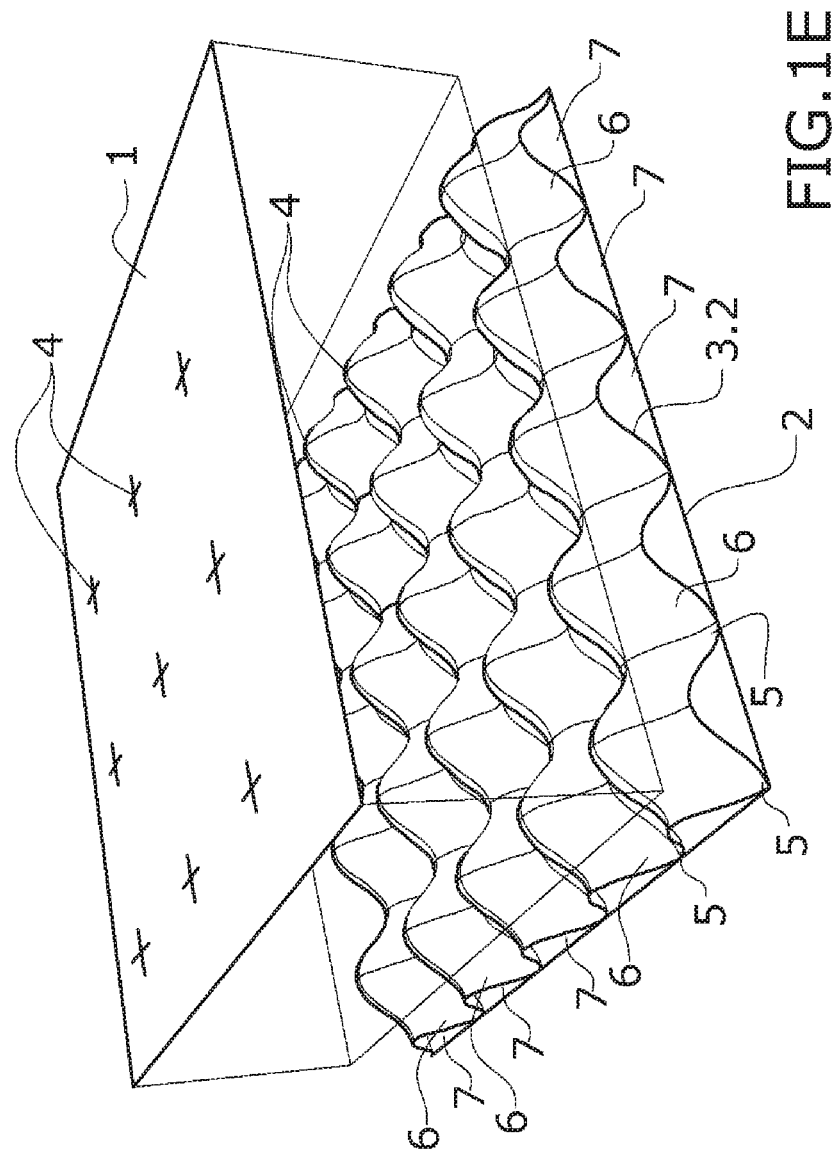
Figure 1F:
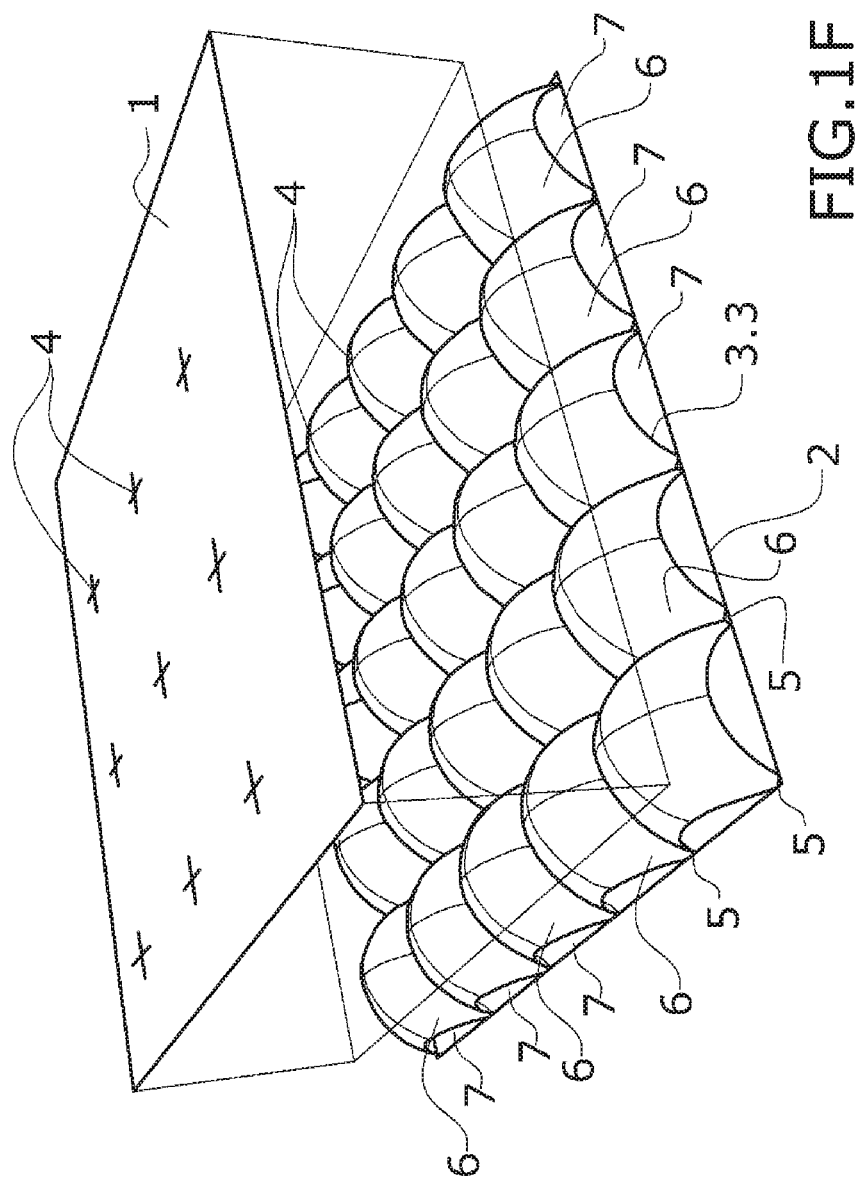

FIGS. 1B, 1D, 1E and 1F show general schematic representations of other possible embodiments of the plate, in which the intermediate structure can have the form of a multidirectionally folded, curved or undulate strip:

- In FIGS. 1B and 1D, the intermediate structure (3 or 3.1) has the form of a folded strip, with respective multidirectionally formed folds by means of flat faces in different orientations coming together, defining slightly truncated vertices or peaks that make up the connection points or zones (4) and (5) of said curved strip with the flat upper (1) and lower (2) strips.
- In FIG. 1E, the intermediate structure (3.2) has the form of a multidirectionally undulate strip in a curved and continuous form, defining peaks and troughs that make up the connection points or zones (4) and (5) of said undulate strip with the flat upper (1) and lower (2) strips.
- In FIG. 1F, the intermediate structure (3.3) has the shape of a curved strip, made up of respective multidirectional bulges, the more protruding or depressed points of which make up the connection points or zones (4) and (5) of said folded strip with the flat upper (1) and lower (2) strips.

For possible embodiments of the plate, such as the ones represented in FIGS. 1B, 1D, 1E and 1F, the intermediate structure can be produced by joining repeated modules, manufactured and connected using known materials, mechanisms and processes.

In relation to the foregoing, it must also be considered that for some possible embodiments of the plate, such as those represented in FIGS. 1B, 1E and 1F, the shape of the folded, curved or undulate strip, which in such cases makes up the intermediate structure, can be obtained from a surface that is slightly truncated, if necessary, generated by means of the movement of a flat generatrix, continuous and broken, curved or undulate, throughout a directrix, also flat, continuous and broken, curved or undulate.

The joints between the upper contact zones of the intermediate structure (4) and the flat upper strip (1), and between the lower contact zones of the intermediate structure (5) and the flat lower strip (2), can be made by means of known mechanisms, which in some possible embodiments could consist of metal plates or connectors, angular profiles, screws, male-female coupling, joining by means of adhesives, etc.

If the plate is used as an integral system of slabs for buildings, the wide continuous interstitial spaces (6) and (7) defined on the inside thereof function as integrated hollowed-out chambers, permanently accessible for the placement of installations and channels, and even for the distribution of heat and cold to adjacent inhabited spaces, eliminating the need to build additional chambers, spaces or channels, as is currently the case with slabs that are used in the state of the art.

In one possible embodiment of the plate for the use thereof as an integral system of slabs for buildings, in which the continuous channels (6) and (7) are efficiently used, the flat outer strips (1) and (2) are arranged separated from one another at such a distance that the total thickness of the plate is no greater than the actual thickness of a typical slab in the state of the art (including in this last actual thickness not only the edge of the resistant slab, but also the thickness occupied by the installations or conduits that must be arranged attached to said resistant slab). In such case, it has been proven by means of models and simulations that a lightweight plate with the characteristics described, given that the total thickness thereof collaborates in the main structural function, can support spans of typical building dimensions resting directly on pillars, without the need to be supported by beams in any direction, supporting the weight of the overloads established by the corresponding regulations, as represented in FIG. 2.

Figure 2:
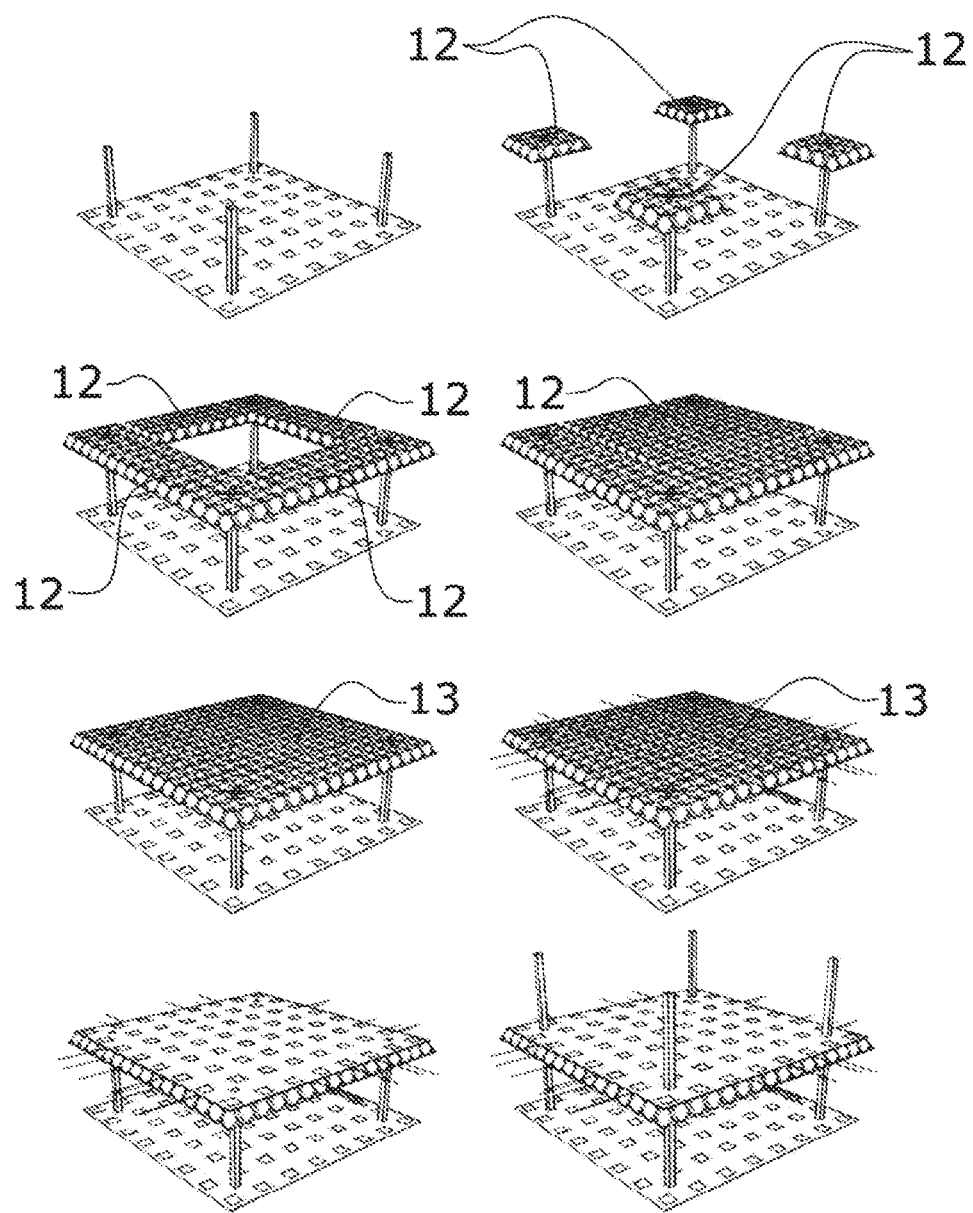
In FIG. 2, a diagram is provided of the construction process of an integral system of slabs for buildings, by means of mounting wide panels or segments of the plate object of the invention.

The typical construction process of an integral system of slabs for buildings (13), based on the plate object of the invention, is schematically represented in FIG. 2. First, modules, panels or wide segments of the plate (12) are prefabricated. These modules or panels are transferred to the worksite, supported directly by columns or pillars, or by other previously placed modules or panels, and they are dryly connected by means of mechanical joints and the application of adhesives or joint sealants. Lastly, the necessary installations and conduits are placed inside the plate, and the flat upper strip is finished by installing the corresponding pavement.

Figure 3A:
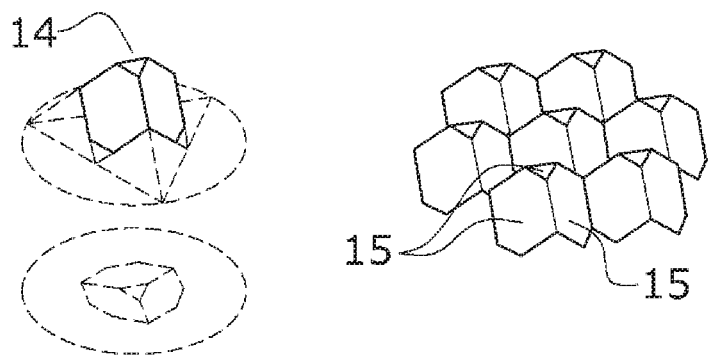
FIGS. 3A, 3B and 3C show different types of modules or decompositions in modular pieces of the intermediate structure for some possible embodiments of the modular hollowed-out plate.

In some possible embodiments of the plate, which could be manufactured from a very small number of types of simple pieces, the multidirectionally folded, curved or undulate intermediate structure (3) is obtained by joining repeated modules. In more simple possible embodiments, for the uses previously described, said modules have the shape of truncated pyramids, or pyramid trunks, hollowed-out and trimmed, or repeated groups of the same, such as those represented in FIGS. 3A, 3B and 3C. In FIG. 3A, the truncated pyramids (14) have a triangular base, in FIG. 3B the truncated pyramids (14) have a quadrangular base, and in FIG. 3C, the truncated pyramids (14) have a hexagonal base. In all cases, the pyramid shape can be obtained by means of the different flat pieces, which correspond to the faces (15) of the trunks of the pyramid, as generally and schematically shown in FIG. 4.

Figure 4:
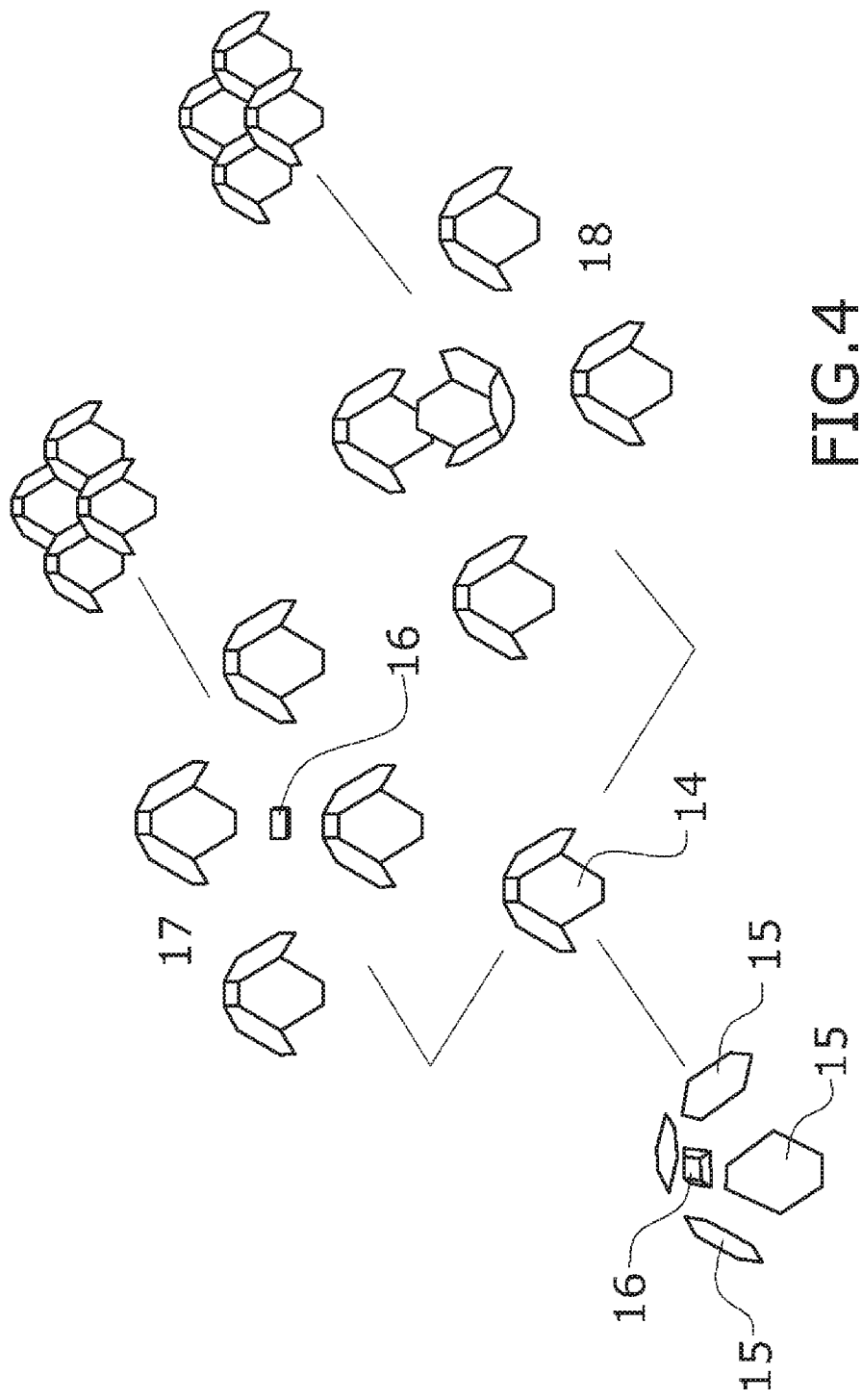
In FIG. 4, a diagram is provided for possible alternatives for the embodiment of the different pieces, the grouping and joining mechanisms of the modules of the previous figures.

In the complete assembly of the plate, the faces (15) of the truncated pyramids (14) go from the flat lower strip (2) to the flat upper strip (1), said faces remaining flat and connected to the flat outer strips, and to each other in the case of being manufactured using flat pieces, by any of the known means, without having to necessarily coincide with those represented in FIG. 4, even by means of metal plates or connectors, angular profiles, screws, male-female coupling, joining by means of adhesives, etc.

For possible embodiments of the plate wherein the intermediate structure (3) consists of joining modules in the shape of truncated pyramids (14), one may use pieces (16) with a geometry that coincides with the ends of the trunks of the pyramids in order to facilitate the anchoring of said modules to the flat outer strips (1) and (2) in the corresponding connection zones or points (4) and (5). If the modules in the shape of truncated pyramids (14) are produced by joining the flat pieces that correspond to the faces (15) thereof, the pieces (16) arranged on the ends of the trunks of the pyramids also serve to facilitate the connection of said flat pieces, according to the representation in FIG. 4.

For possible embodiments of the plate based on modules in the shape of truncated pyramids (14), the intermediate structure (3) is formed by joining said individual modules, repeatedly arranged according to a matrix in accordance with the specific geometry thereof, able to facilitate the connection thereof by means of the pieces (16) described, as represented in (17), in one of the two alternative possibilities shown in FIG. 4. The other possibility, shown in said figure, consists of the arrangement of the individual modules, repeated according to a matrix in accordance with the specific geometry thereof, in duplicate and against each other, in such a way that it is only necessary to connect them to the flat outer strips (1) and (2), and the modules themselves act as male-female mechanism for the mutual coupling thereof.

Figure 3B:
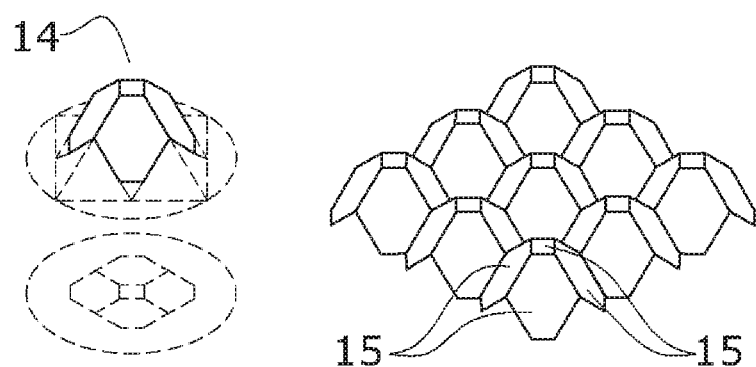
Figure 3C:
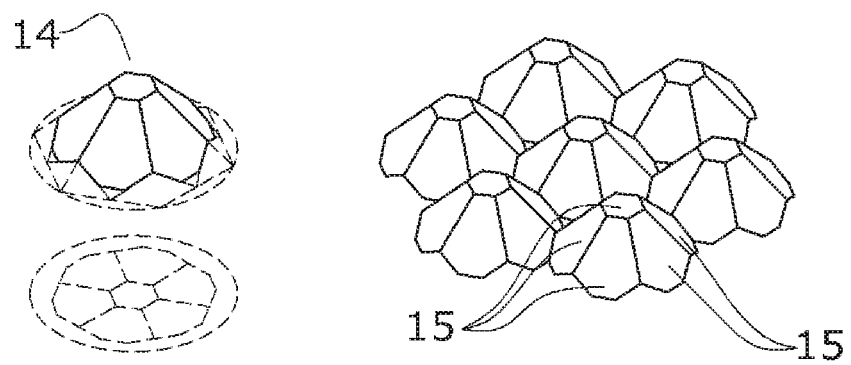

FIGS. 5A, 5B, 5C and 5D show perspective views of a preferred embodiment of the plate object of the invention based on the modules in the shape of truncated pyramids represented in FIGS. 3B and 4, for the use thereof as an integral system of slabs for buildings (13).

It can be seen how linear elements, pieces or reinforcing slats (8) can be attached to the flat upper strip (1), in this case oriented in two transverse directions, and regularly separated from each other, which can also serve as a means for fastening by fitting or male-female coupling of the modules of the intermediate structure (3), which in the case shown are truncated pyramids (14).

The same considerations can be made with respect to the lower strip (2), in other words, reinforcement linear elements, pieces or slats (9) can also serve for coupling the lower ends of the trunks of the pyramids on said lower strip.

Figure 5A:
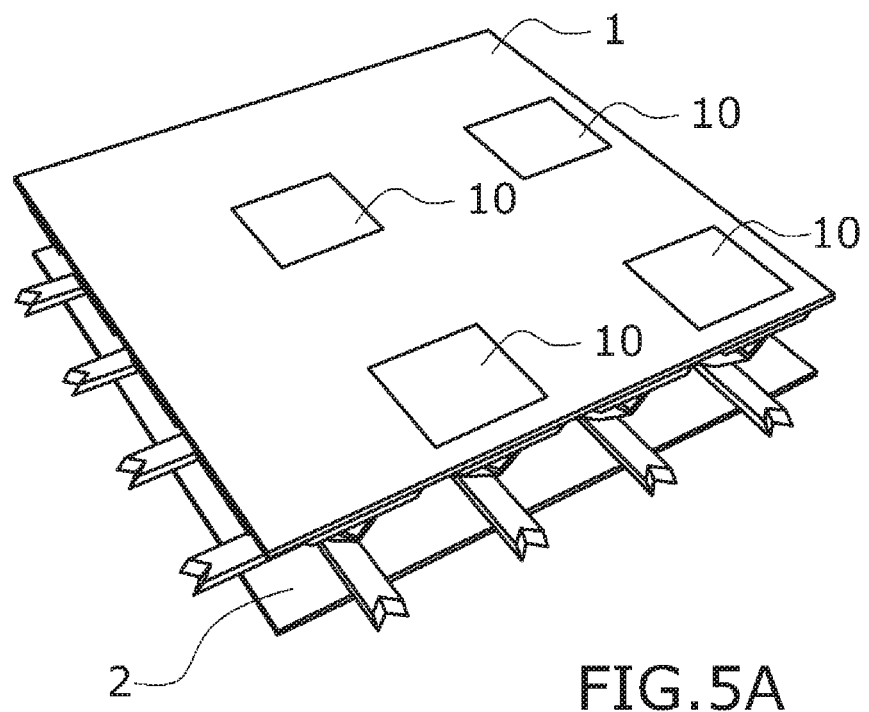
FIGS. 5A, 5B, 5C and 5D show perspective views of a preferred embodiment of the plate object of the invention based on the modules of the previous figures for the use thereof as an integral system of slabs for buildings. In the figures, some parts of the plate are successively suppressed so that inner details of the assembly, and specifically of the connection mechanisms between the individual modules that make up the intermediate structure and the flat upper and lower strips, can be seen in this preferred embodiment of the plate.
Figure 5B:
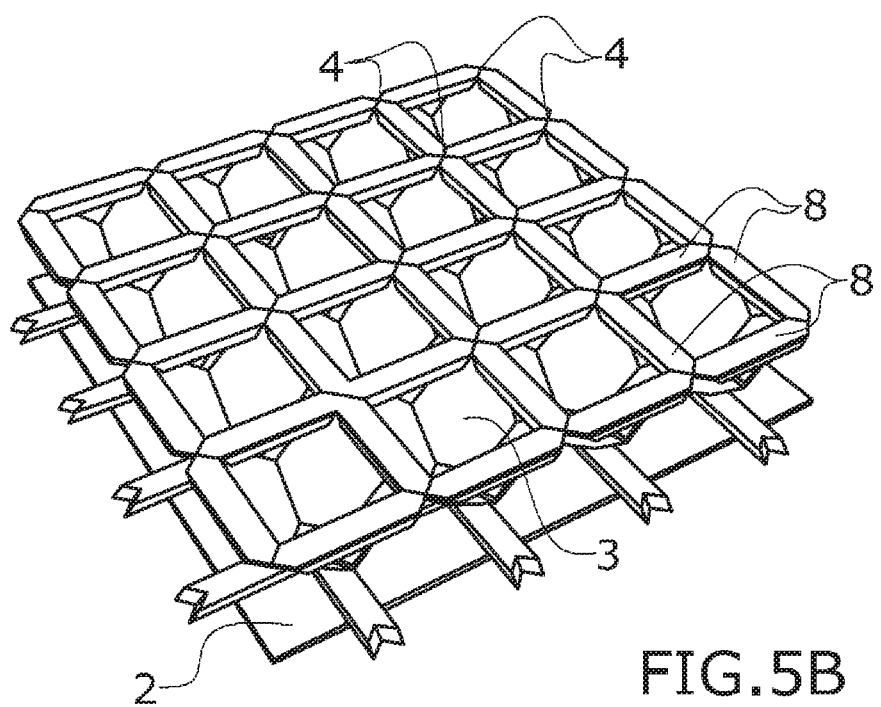
Figure 5C:
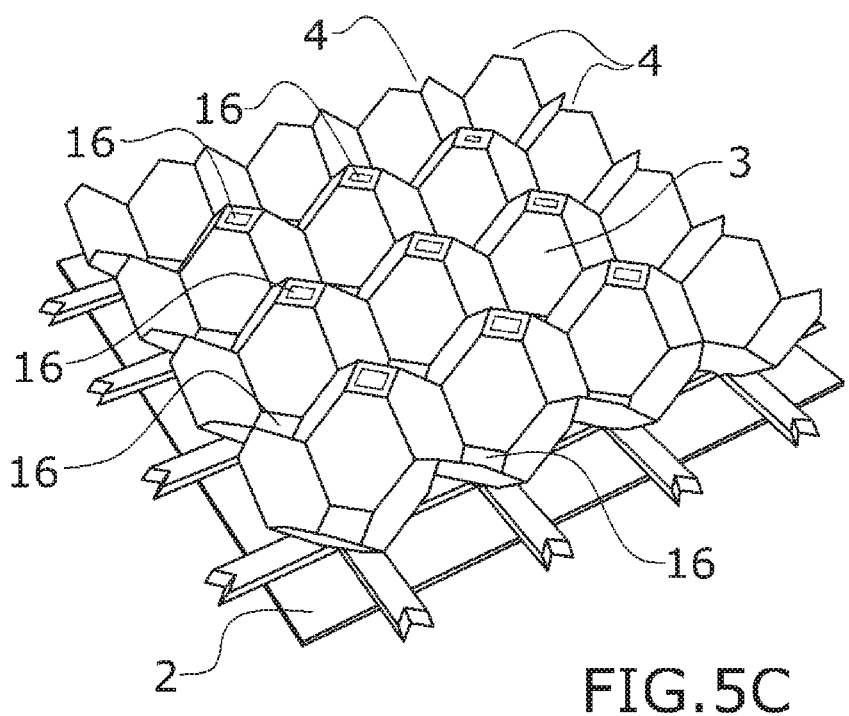
Figure 5D:
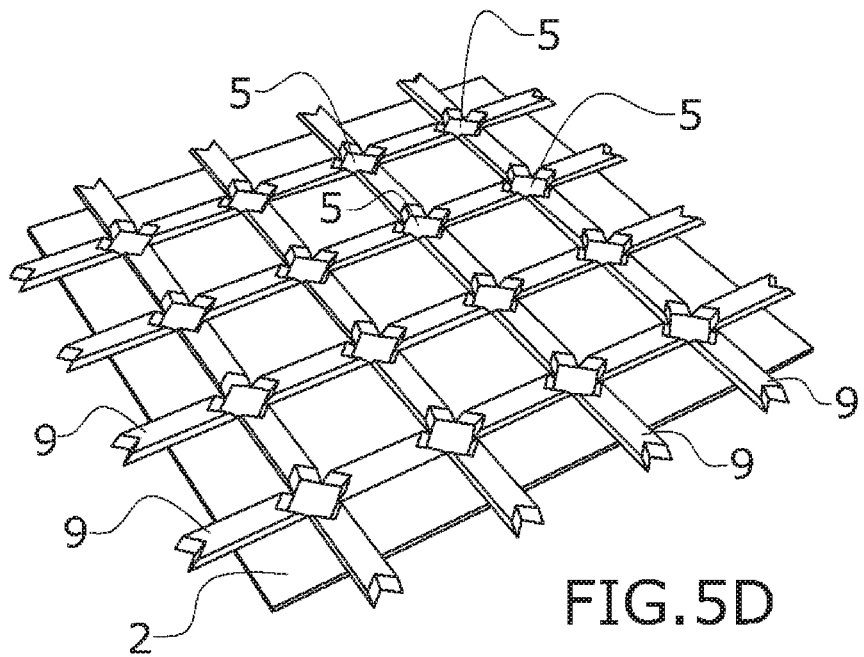

Another possible similar embodiment form of the fastening of the individual modules would consist of, on the lower face of the upper flat strip (1) and on the upper face of the lower flat strip (2), making a series of projections, veins or perforations of the geometry coinciding with the ends of the trunks of the pyramid, in the corresponding connection zones or points (4) and (5), similar to that which is represented in FIG. 5D, such that the fastening of the elements of the intermediate structure on the flat outer strips is done by fitting.

The preferred embodiment of the plate in FIGS. 5A, 5B, 5C and 5D would be made up of a very reduced number of simple type pieces, with simple joining mechanisms that could be made with common materials, such as gypsum board, laminated or reinforced with fiber, wood fiber boards, any other type of light boards, wood profiles, metal profiles, etc.

Having thus adequately described the nature of the present invention, as well as how to put it into practice, it must be noted that, within its essential nature, the invention may be carried out according to other embodiments differing in detail from that set out by way of example, which the protection sought would equally cover, provided that the fundamental principle thereof is not altered, changed or modified.

The invention claimed is:

1. A resistant modular hollowed-out plate for manufacturing slabs, which comprises:
   a flat upper strip;
   a flat lower strip;
   a multidirectionally folded, curved or undulate intermediate structure arranged between the upper strip and the lower strip, and which is joined to the upper and lower strips at contact zones or connection points and, intermittently located and distributed, such that it defines at least two chambers, channels or hollowed-out spaces, interstitial and continuous, which extend throughout the plate in at least two different directions
   wherein;
   the intermediate structure comprises joining modules;
   the upper strip and/or lower strip have perforations;
   the joining modules of the intermediate structure are joined to the upper and lower strips by one or a combination of joining means, consisting of metal plates or connectors, angular profiles, screws, male-female coupling and joining by means of adhesives, and wherein the upper strip and/or lower strip have linear reinforcements contained on a surface thereof wherein
   the joining modules are separate pieces of truncated pyramids with a polygonal base, the truncated pyramids are made up of a series of the separate pieces corresponding to faces of the truncated pyramids, the separate pieces are joined to one another and end pieces with a geometry which coinciding with ends of the truncated pyramids, the end pieces being joined to the upper strip and to the lower strip and wherein the hollowed-out plate is a slab.

2. The resistant modular hollowed-out plate according to claim 1 wherein the polygonal base is a triangular base, a quadrangular base or a hexagonal base.

3. The resistant modular hollowed-out plate according to claim 1, wherein the truncated pyramids on the upper and lower strips, pieces are fastened with a geometry coinciding with ends of the truncated pyramids.

4. The resistant modular hollowed-out plate according to claim 1, wherein the joining modules are distributed according to a matrix arrangement.

5. The resistant modular hollowed-out plate according to claim 1, wherein the joining modules are distributed according to a matrix arrangement, in duplicate and against each other.

6. The resistant modular hollowed-out plate for manufacturing slabs, according to claim 1
   wherein
   the linear reinforcements are reinforcement slats fastened to the upper and lower strips, or projections or the perforations, regularly distributed and separated for male-female fastening to the joining modules.

\* \* \* \* \*